US008302621B2

(12) United States Patent
Schniederjan et al.

(10) Patent No.: US 8,302,621 B2
(45) Date of Patent: Nov. 6, 2012

(54) PRESSURE LIMITING VALVE WITH REDUCED DIFFERENTIAL AREA

(75) Inventors: Reinhold Schniederjan, Neu-Ulm (DE); Markus Gepraegs, Ulm (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 400 days.

(21) Appl. No.: 11/793,857

(22) PCT Filed: Dec. 19, 2005

(86) PCT No.: PCT/EP2005/013678
§ 371 (c)(1),
(2), (4) Date: Jul. 30, 2007

(87) PCT Pub. No.: WO2006/069667

PCT Pub. Date: Jul. 6, 2006

(65) Prior Publication Data
US 2008/0210313 A1    Sep. 4, 2008

(30) Foreign Application Priority Data

Dec. 22, 2004    (DE) .......................... 10 2004 061 862

(51) Int. Cl.
*F16K 17/26* (2006.01)
(52) U.S. Cl. ................... 137/493.3; 137/493.6; 137/538
(58) Field of Classification Search ............... 137/493.1, 137/493.2, 493.3, 493.6, 528, 535, 538, 540, 137/542
See application file for complete search history.

(56) References Cited

U.S. PATENT DOCUMENTS 4,016,903 A * 4/1977 Akashi et al. .............. 137/493.5
4,217,927 A    8/1980 Morita

FOREIGN PATENT DOCUMENTS

| DE | 196 31 625 A1 | 2/1998 |
| DE | 199 44 808 C1 | 3/2001 |
| EP | 0823576 A2 * | 2/1998 |
| JP | 2001153170 A | 6/2001 |

OTHER PUBLICATIONS

European Patent Office, taken on Aug. 31, 2011, Machine translation of DE19631625.*
Japanese Office Action dated Mar. 1, 2011 for Patent Application No. 2007-547312 together with English language translation.

* cited by examiner

*Primary Examiner* — John K Fristoe, Jr.
*Assistant Examiner* — Craig J Price
(74) *Attorney, Agent, or Firm* — Scully, Scott, Murphy & Presser, P.C.

(57) ABSTRACT

A pressure limiting valve comprises a valve closing body (7) which comprises a valve closing surface (8) which together with a first valve seat (9) opposing the valve closing surface (8) forms a first seal seat and a valve closing body orifice (11), which is surrounded by a second valve seat (12) which together with a closing head (14) configured on an axially displaceable valve bolt (13) forms a second seal seat and with a spring plate (15) which is connected to the valve bolt (13) and axially displaceable therewith, and a first return spring (10) clamped between the spring plate (15) and the valve closing body (7), which pretensions the valve bolt (13) against the second valve seat (12) configured on the valve closing body (7) and a second return spring (35) which pretensions a valve unit (7, 13, 15, 10) against the first valve seat (9). In the valve bolt (13) a longitudinal bore (53) is provided extending over the entire axial length of the valve bolt (13).

6 Claims, 2 Drawing Sheets

PRESSURE LIMITING VALVE WITH REDUCED DIFFERENTIAL AREA

BACKGROUND OF THE INVENTION

1. Field of the Invention

The invention relates to a hydraulic pressure limiting valve which has a smaller differential measurement area for reducing the spring forces.

2. Discussion of the Prior Art

Pressure limiting valves and switch valves are already known as individual components in various configurations.

A pressure limiting valve is known from DE 196 31 625 A1 with a feed function according to the preamble of claim 1. The valve comprises a valve closing body which has a valve closing surface which, together with a first valve seat opposing the valve closing surface, forms a first seal seat for the feed function and a valve closing body orifice which is surrounded by a second valve seat which, together with a closing head configured on an axially displaceable valve bolt, forms a second sealing body for the pressure limiting function. In this context, the principal construction of a pressure limiting valve is disclosed.

A disadvantage with the known directly controlled pressure limiting valves is, in particular, that with higher volumetric flow rates the cross-sections and therefore also the measurement areas become larger, with the result that the compression springs are also stronger and therefore more difficult to handle.

SUMMARY OF THE INVENTION

The object of the invention, therefore, is to provide a pressure limiting valve which, on the one hand, is directly controlled but, on the other hand, is provided with a differential measurement area in order to keep the compression spring forces as low as possible.

Advantageously, the valve bolt comprises a longitudinal bore which ensures that the effective area subjected to the high pressure is reduced. As a result, the advantages of a directly controlled valve may also be utilised for large volumetric flow rates, as the size of the springs does not have to be as large, as the spring only has to absorb the forces acting on the differential area on the seal seat. The handling of the springs is therefore easier and has an advantageous effect on the assembly and constructional space required.

The sub-claims contain advantageous developments of the invention.

BRIEF DESCRIPTION OF THE DRAWINGS

The invention is described in more detail hereinafter with reference to a preferred embodiment and referring to the drawings, in which.

DETAILED DESCRIPTION OF THE INVENTION

Figure 1:
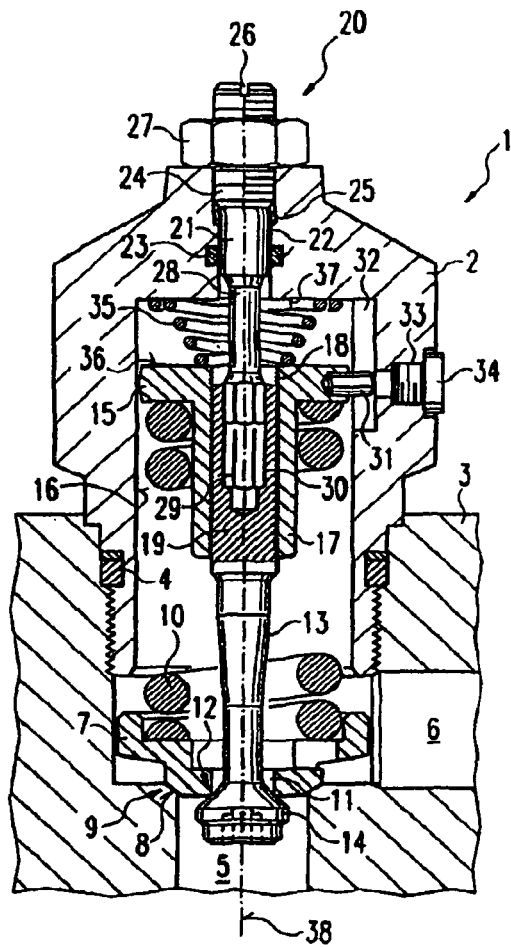
FIG. 1 is a diagrammatic sectional view of an embodiment of a pressure limiting valve according to the prior art.

For better understanding of the features according to the invention, FIG. 1 shows an embodiment of a hydraulic valve 1 with a combined pressure limiting and feed function according to the prior art.

The hydraulic valve is generally denoted by the reference numeral 1. A valve housing 2 is inserted and/or screwed into a valve seat 3 shown only diagrammatically and sealed by means of a sealing ring 4. A feed connection 5 and a working line connection 6 are configured in the valve seat 3 which are connected to one another by the hydraulic valve 1.

On its end facing the feed connection 5, the hydraulic valve 1 comprises a valve closing body 7 on which a valve closing surface 8 is formed, configured in the embodiment as a truncated cone. The valve closing surface 8 cooperates with a first valve seat 9 opposing the valve closing surface 8 to form a first seal seat.

The valve closing body 7 further comprises a valve closing body orifice 11 which is surrounded on the outside by a second valve seat 12. The second valve seat 12 cooperates with a closing head 14 provided on a valve bolt 13 to form a second seal seat. In the embodiment, the valve bolt 13 extends through the valve body orifice 11 so that said valve body orifice is sealed on the outside by the closing head 14. On its end opposing the closing head 14 the valve bolt 13 is connected to a spring plate 15. A first return spring 10 extends between the spring plate 15 and the valve closing body 7, such that the first return spring 10 is clamped between the spring plate 15 and the valve closing body 7. As a result, the valve bolt 13 is pretensioned, such that its closing head 14 bears sealingly against the second valve seat 12 surrounding the valve body orifice 11. The valve bolt 13, the first return spring 10 and the spring plate 15 are received by an axial bore 16 of the valve housing 2.

The spring plate 15 comprises an axial shaft 17 in which an axial longitudinal bore 18 is formed for receiving a connecting portion 19 of the valve bolt 13. The connecting portion 19 of the valve bolt 13 is provided with an external thread which engages in a corresponding internal thread of the axial longitudinal bore 18 of the spring plate 15. The axial position of the spring plate 15 relative to the connecting bolt 13 may therefore be altered by turning the valve bolt 13 relative to the spring plate 15, whereby the pretensioning of the first return spring 10 may be adjusted.

To alter the pretensioning of the first return spring 10 the hydraulic valve 1 comprises an adjustment device 20 accessible from the outside which is configured in the embodiment as an adjusting bolt 21. The adjusting bolt 21 penetrates an axial bore 22 in the valve housing 2 and is sealed by means of a sealing ring 22. The adjusting bolt 21 comprises a threaded portion 24 with an external thread which is guided in an internal thread 25 of the valve housing 2. The adjusting bolt 21 may be turned by a suitable tool, which for example acts on a screwhead slot 26, the rotational position of the valve bolt 21 in the embodiment being secured by a lock nut 27.

On a portion 28 projecting into the axial bore 16 of the valve housing 2, the adjusting bolt 21 comprises a peg 29 with a polygonal outer profile. The peg 29 engages in an axial recess 30 which is provided on the end of the valve bolt 13 facing away from the closing head 14. The recess 30 comprises a polygonal inner profile which is adapted to the polygonal outer profile of the peg 29 such that by the cooperation of the polygonal outer profile of the peg 29 with the polygonal inner profile of the recess 30 a frictional connection is produced which transfers the torque exerted on the adjusting bolt 21 to the valve bolt 13. In the axial direction relative to the longitudinal axis 38 of the hydraulic valve 1, the peg 29 is, however, freely displaceable in the recess 30 so that when the hydraulic valve 1 is actuated the valve bolt 13 may freely move in the axial direction. A hexagonal profile or a torx profile, for example, are suitable as polygonal profiles.

The spring plate 15 is fixed by means of a locking device which in the embodiment consists of a pin 31 projecting radially from the spring plate 15, in particular a threaded pin 31, which is freely displaceable in the axial direction in a groove 32 formed in the valve housing 2. In this manner the spring plate 15 is prevented from turning therewith, when a torque is transmitted to the valve bolt 13 via the valve bolt 21. The pin 31 may be accessible from the outside via a housing bore 33 which may be sealed in a pressure sealed manner by a sealing element 34, in order to allow the pin to be inserted, in particular screwed, into the spring plate 15 after inserting the spring plate 15 into the valve housing 2.

As the valve bolt 13 is connected, as already mentioned, via a thread to the spring plate 15, twisting the valve bolt 13 by means of the adjusting bolt 21 produces a relative axial alteration of the position of the spring plate 15 relative to the valve bolt 13. In this manner the pretensioning of the first return spring 10 may be adjusted externally via a tool acting on the adjustment device 20.

Between the front face 36 of the spring plate 15 facing away from the closing head 14 and the front face 37 of the axial longitudinal bore 16 of the housing 2, a second return spring 35 is arranged in order to exert a restoring force on a valve unit consisting of the valve closing body 7, the valve bolt 13, the spring plate 15 and the first return spring 10.

The function of the hydraulic valve 1 is disclosed below. The same function also applies in principle to the pressure limiting valve with a feed function according to the invention shown in FIG. 3.

For the description of the pressure limiting function, it is assumed that an operating pressure is applied to the working line connection 6 which is substantially greater than the feed pressure applied to the feed connection 5. The valve closing surface 8 of the valve closing body 7 therefore bears sealingly against the valve seat 9. The closing head 14 of the valve bolt 13 bears sealingly against the valve seat 12 surrounding the valve closing body orifice 11, due to the pretensioning exerted by the first return spring 10, so that the hydraulic valve 1 is closed below a maximum pressure which may be preset.

The high pressure applied to the working line connection 6, acts on the closing head 14 via the valve closing body orifice 11, so that the valve bolt 13 is subjected to the high pressure in the opening direction. As soon as these force components acting in the opening direction, exceed the counter force exerted by the first return spring 10 in the closing direction on the spring plate 15 and thus on the valve bolt 13, the closing head 14 lifts up from the second valve seat 12 and opens up the valve body orifice 11. The high pressure line connected to the working line connection 6 is therefore pressure balanced via the hydraulic valve 1 toward the feed line attached to the feed connection 5, until the high pressure prevailing in the high pressure line falls below the maximum pressure causing the hydraulic valve 1 to open. The maximum pressure causing the hydraulic valve 1 to open is dependent on the pretensioning of the first return spring 10 which may be adjusted as disclosed above via the adjustment device 20.

As long as the working line subjected to low pressure is connected to the working line connection 6, the hydraulic valve 1 operates according to its feed function as a non-return valve. When the feed pressure applied to the feed connection 5 is greater than the pressure on the working line connection 6, the hydraulic valve 1 opens, by the valve unit consisting of the valve closing body 7, valve bolt 13, spring plate 15 and first return spring 10 being lifted in the axial direction, so that the valve closing surface 8 of the valve closing body 7 is lifted from the first valve seat 8 and thus opens up the connection between the feed connection 5 and the working line connection 6.

To lift the unit consisting of the valve closing body 7, valve bolt 13, spring plate 15 and first return spring 10, only the relatively low restoring force exerted by the second return spring 35 has to be overcome. The restoring force exerted by the second return spring 35 is considerably lower than the closing force exerted by the first return spring 10, so that the hydraulic valve 1 in this case operates as a non-return valve. As a result, hydraulic fluid is prevented from flowing back from the working line connected to the working line connection 6 into the feed line connected to the feed connection 5, when the pressure in the working line exceeds the pressure in the feed line.

For improved clarity, a possible use of the hydraulic valve 1 for a hydrostatic drive system is disclosed below with reference to FIG. 2. The same preferred use also applies to the pressure limiting valve with a feed function according to the invention shown in FIG. 3.

The hydrostatic drive system consists of a hydraulic pump 40, which is connected to a hydraulic motor 43 via a first working line 41 and a second working line 42. The hydraulic pump 40 may be driven by a drive shaft 44, for example of an internal combustion engine not shown. A feed pump 45 is also driven in addition to the hydraulic pump 40 via the drive shaft 44, which draws in hydraulic fluid from a hydraulic fluid tank 46 and feeds it into a feed line 47. A pressure limiting valve 48 of conventional construction, which connects the feed line 47 to the hydraulic fluid tank 46, serves to limit the pressure of the feed line 47.

A first hydraulic valve 1.1 is arranged between the first working line 41 and the feed line 47 whilst a second hydraulic valve 1.2 is arranged between the second working line 42 and the feed line 47. The hydraulic valves 1.1 and 1.2 shown in FIG. 2 are configured according to the embodiment which has been already disclosed with reference to FIG. 1.

Depending on the direction of conveyance of the hydraulic pump 40, one of the working lines 41, 42 is subjected to high pressure whilst the other respective working line 42, 41 is subjected to low pressure. The hydraulic valves 1.1 and 1.2 ensure that the feeding is carried out respectively into the working line 41 or 42 containing low pressure. The hydraulic valves 1.1 and 1.2 therefore operate as non-return valves, the hydraulic valve 1.1 and/or 1.2 connected to the working line 41 and/or 42 containing high pressure, closing, the other respective hydraulic valve 1.2 and/or 1.1, opening. Whilst the hydraulic valve 1.2 and/or 1.1 connected to the low pressure line adopts the feed function, the other respective hydraulic valve 1.2 and/or 1.1 adopts a pressure limiting function in order to limit the pressure in the working line 41 and/or 42 containing high pressure, to a maximum pressure which may be preset by the adjustment device 20. If the pressure in the working line 41 and/or 42 containing high pressure exceeds this maximum pressure, the hydraulic valve 1.1 and/or 1.2 pressure balances the working line 41 and/or 42 containing high pressure via the feed line 47 and the pressure limiting valve 48 toward the pressure medium tank 46. Overloading the working lines 41, 42 is thereby reliably prevented.

Figure 3:
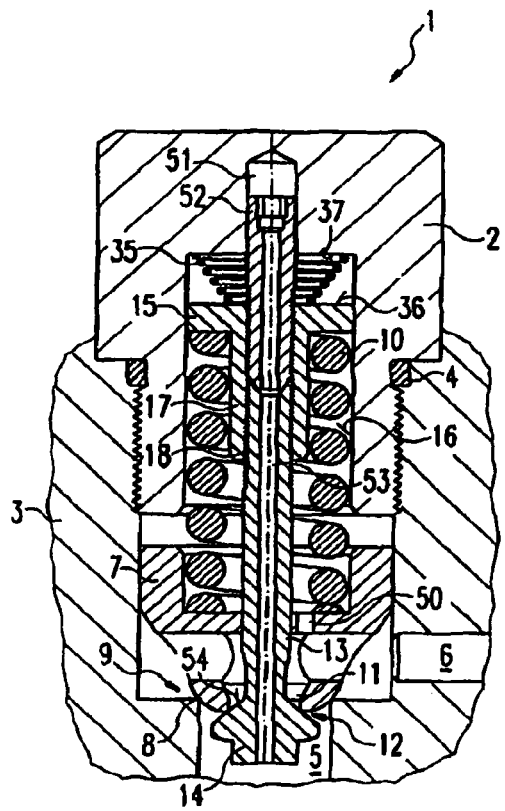
FIG. 3 is a diagrammatic sectional view of a pressure limiting valve according to the invention in a section along the longitudinal axis of the valve.

FIG. 3 shows an embodiment of a pressure limiting valve 1 configured according to the invention in a diagrammatic sectional view. The pressure limiting valve 1 may therefore be configured according to the prior art in a similar manner to the hydraulic valve 1 shown in FIGS. 1 and 2, apart from the features according to the invention. The same reference numerals have therefore been used in FIG. 3 as in FIG. 1 for the same respective parts, so that in this respect repeating the description is unnecessary.

As already explained above, a pressure which is substantially greater than the feed pressure applied to the feed connection 5 is applied to the working line connection 6. The valve closing surface 8 of the valve closing body 7 therefore also bears sealingly against the valve seat 9 in the embodiment shown in FIG. 3 of a pressure limiting valve 1 configured according to the invention. Similarly, the closing head 14 of the valve bolt 13 bears sealingly against the valve seat 12 surrounding the valve closing body orifice 11, as it is impinged upon by the pretensioned return spring 10. The high pressure is therefore applied to the closing head 14 of the valve bolt 13 in the entire longitudinal bore 16 and via a bore 50, so that the valve bolt 13 is subjected to the high pressure in the opening direction.

Figure 2:
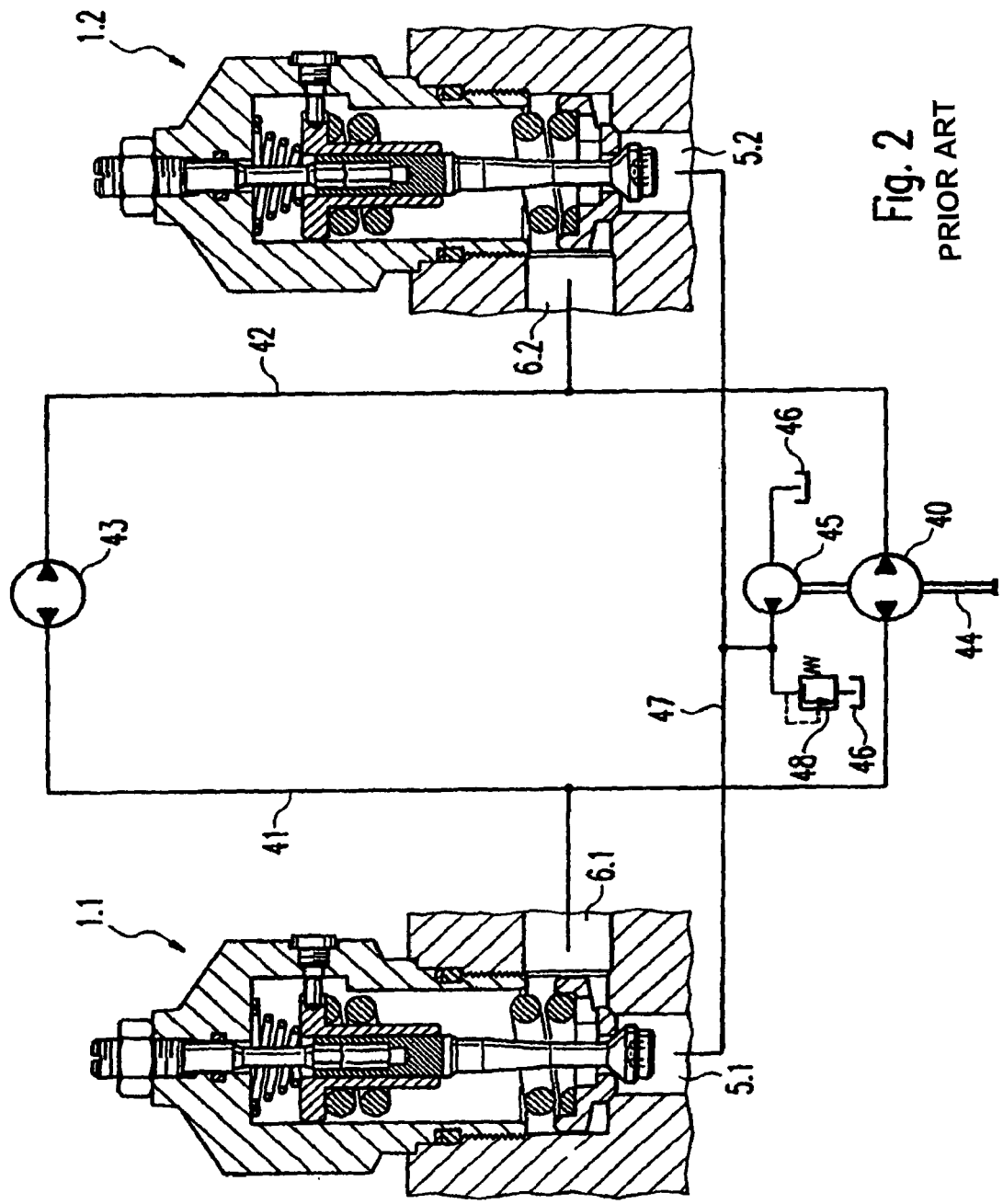
FIG. 2 is a diagrammatic view of the use of two pressure limiting valves according to the prior art in a hydrostatic drive system.

Therefore, in contrast to the valve 1 according to the prior art disclosed in FIGS. 1 and 2, the valve bolt 13 is guided by the valve closing body 7, as said valve closing body tightly encloses the valve bolt 13. The pressure equalisation is carried out via the bore 50 in the valve closing body 7. As the spring plate 15 does not bear sealingly against the inner wall of the longitudinal bore 16, high pressure also prevails in the region of the second return spring 35.

According to the invention, the pressure limiting valve 1 comprises in the housing 2 a blind bore 51 into which a portion 52 of the valve bolt 13 extends. The portion 52 of the valve bolt 13 may either be configured in one piece therewith or, however, represent a separate component as shown in FIG. 3.

Furthermore, according to the invention, the valve bolt 13 is also provided in the portion 52 with a longitudinal bore 53 which is open at both ends over its entire axial length. The longitudinal bore 53 therefore opens out, on the one hand, into the blind bore 51 and, on the other hand, into the feed connection 5.

As low pressure, which is lower than the high pressure applied in the axial bore 16, is applied to the feed connection 5, low pressure is also applied in the blind bore 51 via the longitudinal bore 53. This leads to a reduction in size of the effective areas where high pressure is applied, as the front faces 36 and 37 of the spring plate 15 and the housing 2 are reduced in size compared to a solid valve bolt 13. As a result, an effective area on the valve seat 12 is also reduced by the size of the diameter of the valve bolt 13, so that the low holding force of the first return spring 10 may also be reduced. The closing head 14 is therefore no longer loaded over its entire surface but only over an annular differential area 54.

This results in the first return spring 10 being able to be of smaller design and easier to handle, in particular to assemble, due to a lower spring constant. As a result, the possibilities for adjusting the valve unit are simplified and manufacturing and assembly costs are reduced. By means of the smaller design of the first return spring 10 constructional space is saved and the use of this valve construction for large volumetric flow rates is made possible.

The invention is not restricted to the embodiment shown but may also be used for other types of construction of valves 1. All features of the invention may be combined with one another in any manner.

The invention claimed is:

1. A pressure limiting valve comprising:
   a valve closing body which comprises a valve closing surface which together with a first valve seat opposing the valve closing surface forms a first seal seat and a valve closing body orifice, which is surrounded by a second valve seat which together with a closing head configured on an axially displaceable valve bolt forms a second seal seat,
   a spring plate which is connected to the valve bolt and axially displaceable therewith,
   a first return spring clamped between the spring plate and the valve closing body, which pretensions the valve bolt against the second valve seat configured on the valve closing body; the valve bolt, the spring plate and the first spring being received in an axial bore of a valve housing, and
   a second return spring which pretensions a valve unit against the first valve seat, wherein:
   (a) the valve bolt is provided with a longitudinal bore which extends over an entire axial length of the valve bolt;
   (b) a feed connection, which is fed by a hydraulic fluid tank, acting in a closing direction applies a low pressure to the closing head of the valve bolt;
   (c) said longitudinal bore is open at an end formed by a closing head facing said feed connection;
   (d) a blind bore is formed in the housing of the pressure limiting valve; and
   (e) low pressure provided by the feed connection is applied in the blind bore via the longitudinal bore of the valve bolt, the valve bolt partially extends into the blind bore of the housing, and the valve bolt is guided in the blind bore, wherein an effective area of a pressure-active front face acting in opening direction of the valve bolt in comparison to the area of the valve closing body orifice is reduced by an area based on the size of the diameter of the blind bore of the housing.

2. The pressure limiting valve according to claim 1, wherein the longitudinal bore is open at an opposing end of the valve bolt.

3. The pressure limiting valve according to claim 1, wherein high pressure is applied in an axial bore of the pressure limiting valve via a working line connection.

4. The pressure limiting valve according to claim 1, wherein the pressure-active front face of the closing head of the valve bolt is reduced to an annular differential area.

5. The pressure limiting valve according to claim 1, wherein the valve bolt is guided in the valve closing body.

6. The pressure limiting valve according to claim 1, wherein a compensating bore is formed in the valve closing body and wherein the spring plate does not bear sealingly against an inner wall of the axial bore.

* * * * *